(12) United States Patent
Tummuru et al.

(10) Patent No.: US 10,795,732 B2
(45) Date of Patent: Oct. 6, 2020

(54) GRID COMPUTING SYSTEM

(71) Applicant: SAP SE, Walldorf (DE)

(72) Inventors: Nethaji Tummuru, Santa Clara, CA (US); Jan Lagarden, East Palo Alto, CA (US); Alex Huntoon, Stamford, CT (US); Vivek Ranjan, Sunnyvale, CA (US); Bhumi Patel, Fremont, CA (US); Vimal Khanna Vadivelu, Sunnyvale, CA (US)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 16/111,910

(22) Filed: Aug. 24, 2018

(65) Prior Publication Data
US 2020/0065155 A1 Feb. 27, 2020

(51) Int. Cl.
*G06F 9/50* (2006.01)
*H04L 29/08* (2006.01)
*H04L 9/08* (2006.01)
*G06F 9/48* (2006.01)

(52) U.S. Cl.
CPC .......... *G06F 9/5072* (2013.01); *G06F 9/4806* (2013.01); *G06F 9/4843* (2013.01); *G06F 9/4881* (2013.01); *G06F 9/5083* (2013.01); *H04L 9/0861* (2013.01); *H04L 67/10* (2013.01)

(58) Field of Classification Search
CPC .... G06F 9/5072; G06F 9/5083; G06F 9/4806; G06F 9/4843; G06F 9/4881; H04L 9/0861; H04L 67/10
See application file for complete search history.

(56) References Cited

U.S. PATENT DOCUMENTS

| 10,250,522 B1* | 4/2019 | Anderson | H04L 47/70 |
| 10,534,655 B1* | 1/2020 | Kinney, Jr. | G06F 9/5027 |
| 2004/0199633 A1* | 10/2004 | Pearson | G06F 9/5072 |
| | | | 709/226 |

(Continued)

OTHER PUBLICATIONS

"Blockchain-Based Decentralized Cloud Computing Version 3.0 (Whitepaper)", iExec, (2017-2018), 1-40.

(Continued)

*Primary Examiner* — Jacob D Dascomb
(74) *Attorney, Agent, or Firm* — Schwegman Lundberg & Woessner, P.A.

(57) ABSTRACT

Various examples are directed to systems and methods for managing a grid computing system. A grid computing management system may be in communication with a grid consumer device and in communication with a plurality of user devices. The grid computing management system may receive, via a computer network and from the grid consumer device, first task description data describing a first task to be performed using the plurality of user devices. The grid computing management system may identify a plurality of task units for executing the first task using the task description data and generate a plurality of task unit modules including a first task unit module that, when executed by a first user device of the plurality of user devices, causes the first user device to execute a first task unit of the plurality of task units. The grid computing management system may receive a ready message from the first user device and send the first task unit module to the first user device.

20 Claims, 10 Drawing Sheets

(56) References Cited

U.S. PATENT DOCUMENTS

2017/0235707 A1* 8/2017 Amacker .......... G06F 16/24554
709/224
2017/0339021 A1* 11/2017 Dukatz ................. H04L 41/145
2018/0048532 A1* 2/2018 Poort ...................... H04L 67/10

OTHER PUBLICATIONS

Nazarov, Sergey, "Secure Decentralized Oracles: Applying Intel SGX and TownCrier to external data, payments and off-chain computation", Ethereum Foundation, [Online]. Retrieved from the Internet: <URL: https://ethereumfoundation.org/devcon3/sessions/secure-decentralized-oracles-applying-intel-sgx-and-towncrier-to-external-data-payments-and-off-chain-computation/>, (2017), 3 pgs.
Zawistowski, Julian, et al., "The Golem Project (Crowdfunding Whitepaper)", Golem, (Nov. 201), 28 pgs.

* cited by examiner

GRID COMPUTING SYSTEM

TECHNICAL FIELD

This document generally relates to methods and systems for use with computer devices, including networked computing devices. More particularly, this document relates to systems and methods for a distributed grid computing system.

BACKGROUND

Providing web content on the Internet is not free. Web content providers need to pay for data storage, domain names, servers, Internet Protocol (IP) addresses, and bandwidth. These costs are amplified for more popular websites. More users lead to higher operating costs as more bandwidth is consumed and, eventually, more servers are needed to handle incoming requests. Furthermore, many websites are run as businesses with employees for developing and maintaining infrastructure and, in some cases, for developing content.

BRIEF DESCRIPTION OF DRAWINGS

The present disclosure is illustrated by way of example, and not limitation, in the following figures.

DETAILED DESCRIPTION

Figure 1:
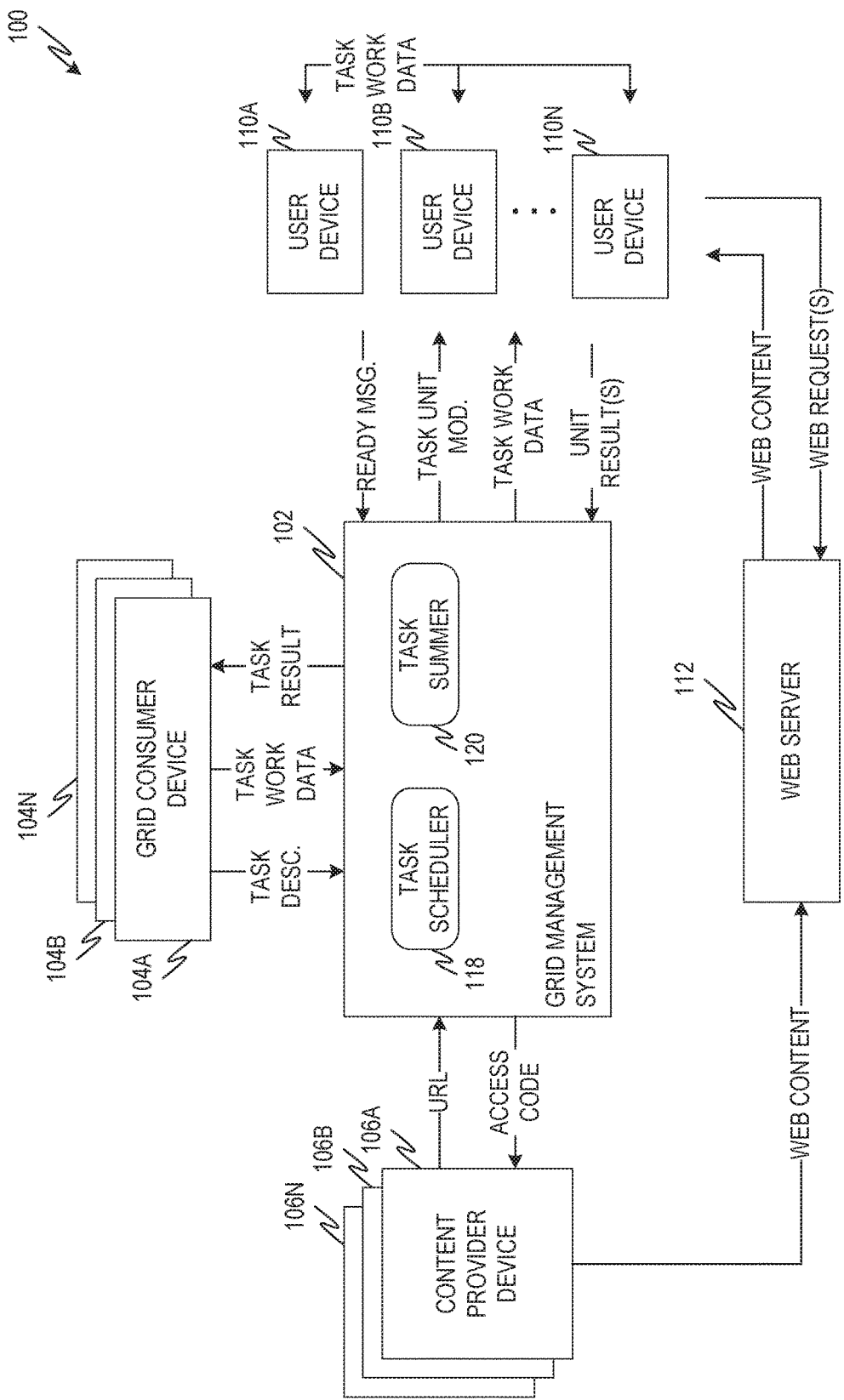
FIG. 1 is a diagram showing one example of an environment for implementing a grid computing system.

The description that follows includes illustrative systems, methods, techniques, instruction sequences, and computing machine program products that embody illustrative embodiments, in the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Many web content generators raise revenue from web content using advertising. The web content generator includes advertising code in the web content provided. When a content consumer loads the web content at a user device, the advertising code is executed in the user device's web browser. The advertising code accesses an advertising server that provides advertising content. The advertising content is embedded into the web content and displayed by the web browser. The web content generator is paid based on the advertising content provided, for example, on a per-click basis, a per-impression basis, or another suitable basis.

Generating revenue from advertising presents a number of difficulties for web content providers. Inefficiencies in advertising due to advertising fraud, low conversion rates, and other factors reduce the revenue generated by web content advertising. Also, advertising networks responsible for targeting advertising content to specific users take a large share of the revenue that is available.

Various examples are directed to a grid computing system that executes at various user devices while the user devices consume web content. The grid computing system, in some examples, provides to web content generators an alternate revenue source that can supplement and/or replace advertising revenue.

The grid computing system is managed by a grid management system to perform various processing tasks. In some examples, the grid computing system is rented to grid consumers, who use the grid computing system to perform various processing tasks that are suitable for grid computing such as, for example, image processing, textual analysis, etc. Fees paid by grid consumers who use the grid computing system can provide a revenue source for web content providers that may be an alternative and/or supplement to advertising revenue.

Implementing a grid computing system with user devices, however, can present considerable technical challenges. For example, dividing computing tasks into task units suitable for execution at individual user devices and then distributing the computing tasks to the user devices can present a considerable challenge. Receiving and aggregating task unit results from the user devices to generate an overall task result can also be challenging.

Further, the success of a grid computing system with user devices may depend on content consumer acceptance. For example, if executing task units at a content consumer's user device causes the user device to bog down, a cooling fan to run, or is otherwise noticeable, the content consumer may avoid web content associated with the grid computing system.

Additionally, because the grid computing system has limited control of the content consumer's user devices, it may be vulnerable to errors and even malicious activity at the user devices. For example, a user device may process a task unit incorrectly and provide an incorrect task unit result. A malicious actor at a user device could deliberately provide an incorrect task result and/or incorrect data to other user devices to make malicious modifications to grid system processing.

These and other challenges are addressed by a grid computing system as described herein. A grid management system provides access code to a content provider. The content provider embeds the access code into web content that is provided to user devices. When a user device receives the web content with the embedded access code, the access code executes at the user device, for example, inside a web browser executing at the user device. The access code, when executed at the user device, causes the user device to send a ready message to the grid management system. The ready message indicates that the user device is available to execute a task or task unit. The ready message also includes an indication of the web content including the access code. (This can be used, as described herein, to track compensation to the content provider.) The ready message can also include information about the user device including, for example, information about the hardware and/or software resources that are available for processing.

The grid management system also receives task descriptions from grid consumers. Grid consumers are entities that use the grid computing system to perform processing tasks. (For example, fees paid by grid consumers for use of the grid computing system can be used to compensate content providers.) Task descriptions, in some examples, are received in and/or converted to Structured Query Language (SQL) or another suitable language. Grid consumers also provide task work data used to perform a described task.

The grid management system expresses the task as a plurality of task units and generates a plurality of task unit modules for execution at user devices. The grid management system can also determine task unit work data for some or all of the task units. Task unit work data is a portion of the task work data for a task that is used for a particular task unit. Each of the plurality of task unit modules is to be executed at a user device to complete one or more of the task units. The task unit modules, in some examples, include web binary code, such as a WebAssembly module. Web binary code can execute at the user device more efficiently than interpreted languages such as JavaScript. For example, web binary code may be pre-compiled and may not need to be interpreted at runtime. Also, web binary code can be optimized at compile time to an extent that may not be practical with interpreted code, which is transformed to a binary at runtime. Using web binary code can reduce the load on the user device, which can minimize degradation to the content consumer experience. Also, in some examples, the task unit modules include code that instructs the user device to launch a service worker in a web browser of the user device to perform the corresponding task unit.

Upon receiving a ready message from a user device, the grid management system selects a task unit to be executed by the user device. The grid management system can select the task unit considering the task units that are available for execution as well as the suitability of the user device associated with the ready message. The suitability of the user device describes how well the hardware and/or software executing at the user device is suited to execute a task unit. Suitability can be based on a trust score for the user device (described in more detail below) and/or on user device characteristics. The trust score describes a likelihood that the user device will return a correct task unit result. User device characteristics describe hardware and/or software at the user device affecting how the user device would execute a task unit. Example user device characteristics include a type of processor or processors at the user device, an amount or type of memory at the user device, and/or a web browser executing at the user device.

The grid computing system described herein can also be configured to consider the trustworthiness of user devices. The grid computing system can generate the trust score described herein for various user devices. The trust score can be based on various different factors including, for example, the performance of the user device on past task units and the response of the user device to a spot check or other test of trustworthiness. The grid management system may use the trust score to determine whether to assign a task unit to a particular trust score. For example, user devices with a trust score lower than a threshold may not be assigned task units. The grid management system may also use the trust score to configure redundancy in the grid computing system. For example, a single task unit can be assigned to multiple user devices. Task unit results from each user device assigned a particular task unit can be compared and a final task unit result selected. In this way, the effect of an error or malicious modification at a single user device can be minimized. The grid management system can select the number user devices based on the trust score for the user device.

In some examples, the grid management system can assign a trust score based on whether the user device includes a processor that implements a secure enclave that is accessible for executing a task unit. Because the secure enclave can operate with lessened risk of interference from a user or application executing at the user device, the trust score of a user device at which a secure enclave is available can be higher.

FIG. 1 is a diagram showing one example of an environment 100 for implementing a grid computing system. The environment 100 includes a grid management system 102, grid consumer device 104A, 104B, 104N, content provider devices 106A, 106B, 106N, and various user devices 110A, 110B, 110N. FIG. 1 also shows an example web server 112. Although one web server 112 is shown in FIG. 1, grid computing systems as described herein can include multiple web servers.

The grid management system 102, grid consumer devices 104A, 104B, 104N, and content provider devices 106A, 106B, 106N can be or include any suitable type of computing devices. For example, each device 102, 104A, 104B, 104N, 106A, 106B, 106N can be or include one or more servers, one or more desktop computing devices, one or more laptop computing devices, etc. User devices 110A, 110B, 110N can be or include any suitable device used by a content consumer to access and view web content. For example, user devices 110A, 110B, 110N can be or include a mobile phone or similar mobile device, a tablet computing device, a desktop computer, a laptop computer, etc. In some examples, user computing devices 110A, 110B, 110N include specialized hardware. For example, a user computing device 110A, 110B, 110N can include one or more graphics processing units (GPUs) and/or hardware optimized for machine learning, such as tensor processing units (TPUs), field programmable gate arrays (FPGAs), etc.

The grid management system 102 receives task description data and task work data from the grid consumer devices 104A, 104B, 104N. Task description data describes a task to be performed by the distributed computing system. Any type of task suitable for executing by a grid computing system may be submitted. In some examples, the grid computing system is configured to execute tasks that are embarrassingly parallel. An embarrassingly parallel task is a task that can be divided into a number of independent parts or task units. The task units can be executed independently at different processors (for example, at different user devices 110A, 110B, 110N). In some examples, the distributed computing system can execute tasks that are not embarrassingly parallel. For example, some task units executed at one user device can depend on data stored at another user device and received via a peer-to-peer connection.

In some examples, the task described by the task description data is not embarrassingly parallel as a whole, but is reducible into individual steps, at least some of which are embarrassingly parallel. The grid management system 102 uses the task description data to derive one or more embarrassingly parallel steps for performing the task described by the task description data. Each embarrassingly parallel step can include a plurality of task units. The grid management system 102 can instruct user devices 110A, 110B, 110N to perform task units associated with a first embarrassingly parallel step. Upon completion of the task units associated with the first embarrassingly parallel step, the grid management system 102 can instruct user devices 110A, 110B, 110N to perform task units associated with the next embarrassingly parallel step, and so on. In some examples, results of task units from one step include task unit work data for task units in the next step. User devices 110A, 110B, 110N executing task units associated with a first step can receive task unit work data in a peer-to-peer manner from other user devices 110A, 110B, 110N that executed task units from the previous step. Peer-to-peer connections between user devices 110A, 110B, 110N can be facilitated using any suitable technology such as, for example, WEBRTC. Example tasks that can be performed by the grid computing system include textual analysis, image processing, relational database queries, brute force cryptographical searches, discrete Fourier transforms, and so on. Consider an example image processing task. The grid computing system can be configured to perform facial recognition by comparing a large number of images showing unknown faces to a large number of known faces. Consider another example task that includes analysis of a corpus of textual work. The distributed computing network can, for example, count the frequency of words used in the corpus. Other example tasks that can be performed by the grid computing system include rendering and ray tracing, statistical analysis, simulations such as Monte Carlo simulations. Other example task that can be performed by the grid computing system include executing and/or training machine learning algorithms such as a genetic algorithm, a particle swarm optimization, or other optimization algorithm.

Task description data can be expressed in any suitable language or format. In some examples, task description data is expressed in a non-executable format. For example, the task description data programming language that generally describes the task without specifying specific procedural steps that are to be executed to perform the task. For example, the task description data can be expressed in a declarative programming language such as Structured Query Language (SQL) or XQuery or in a functional programming language such as Haskell. Expressing task description data in a non-executable format can simplify the process of dividing the task into task units, as described herein. It may also limit the ability of a grid consumer to exploit the grid computing system to perform malicious activities such as denial-of-service (DDoS) attacks.

Task work data is data that is worked to perform a task. In the image processing task example above, task work data includes the images of unknown faces and the images of known faces. In the textual analysis example above, task work data includes the corpus of textual works to be analyzed. Task unit work data is a portion of task data that is worked to perform a task unit. For example, task unit work data can be a subset including less than all of the task work data associated with a task.

Although FIG. 1 shows task description data and task work data being received from a single grid consumer device 104A, the grid computing system, in some arrangements, can execute more than one task concurrently. For example, a single grid consumer device 104A, 104B, 104N can provide more than one concurrent task to the grid management system 102. Also, in some examples, the grid management system 102 can receive task description and task work data for different tasks from different grid consumer devices 104A, 104B, 104N.

The grid management system 102 includes a task scheduler subsystem 118 that receives the task description data and divides it into a number of task units suitable for execution at a user device 110A, 110B, 110N. The task scheduler subsystem 118 can also generate task unit modules for each task unit. Task unit modules include code that can be executed at a user device 110A, 110B, 110N to execute a task unit. For example, the task scheduler subsystem 118 can receive task description data expressed in a non-executable format, such as SQL, and derive task unit modules to execute the task at the user devices 110A, 110B, 110N. As described in more detail herein, task unit modules, in some examples, can include web binary code, such as a WebAssembly module and/or can utilize service workers at the user device web browsers. When multiple tasks are executed concurrently at the grid computing system, the task scheduler can generate task units and corresponding task unit modules for more than one task.

Task unit modules instruct user devices 110A, 110B, 110N to download task unit work data for executing a task unit, execute the task unit, and submit the task unit result to the grid management system 102. A task unit module, when executed at a user device 110A, 110B, 110N can instruct the user device 110A, 110B, 110N to download task work data from another user device 110A, 110B, 110N prior to executing a task unit. In some examples, however, task unit modules, when executed at a user device 110A, 110B 110N, may prevent communication between user devices 110A, 110B, 110N while a task unit is being executed. This may minimize the number of messages exchanged between user devices 110A, 110B, 110N and thereby minimize potential network latency issues. In some examples, task units and task unit modules are generated according to a MapReduce model, where the generating of task units and task unit modules is all or part of a map procedure.

The grid management system 102 also provides a content provider devices 106A, 106B, 106N with executable access code. For example, a content provide device 106A provides the grid management system 102 with a universal resource locator (URL) or other suitable web content address identifying web content. The grid management system 102 replies by providing the access code. In some examples, the access code includes the web content address and causes the user devices 110A, 110B, 110N to include the web content address in a ready message as described herein.

The access code may be expressed in any suitable format including, for example, JavaScript. The content provider device 106A incorporates the access code into web content. The web content can be provided directly to one or more user devices 110A, 110B, 110N or indirectly via the web server 112. For example, the content provider device 106A can provide the web content, with embedded access code, to the web server 112. User devices 110A, 110B, 110N request the web content from the web server 112. The web server 112 provides the web content, with the embedded access code, in response to the web request.

When a user device 110A loads the web content with the embedded access code, the access code executes, for example, in a web browser executed at the user device 110A. The access code, when executed, causes the user device 110A to send a ready message to the grid management system 102. The ready message can include an indication of the web content into which the access code was embedded. This can be used by the grid management system 102 to attribute revenue from grid consumers to the content providers. In some examples, the ready message also includes a unique identifier of the user device 110A, 110B, 110N that sent it, such as a media access control (MAC) address. The ready message can also include information describing user device characteristics, such as a type of web browser executing at the user device, a number and type of processors at the user device, an amount and/or type of memory present at the user device, etc. For example, when executed at the user device, the access code may query an operating system or other component at the user device to gather user device characteristics and include the user device characteristics in the ready message.

The grid management system 102 can receive ready messages from any of the user devices 110A, 110B, 110N that load the web content and thereby execute the access code. Upon receiving a ready message, the grid management system 102 (e.g. the task scheduler subsystem 118) selects a task unit for the user device 110A, 110B, 110N that sent the message. This can include matching the user device characteristics to a particular task unit. For example, a user device 110A, 110B, 110N including a standard processor and limited memory may be assigned a task unit from a task with relatively simple processing. A user device 110A, 110B, 110N that includes a GPU or TPU may be assigned a task unit from a more complex task.

The scheduler subsystem 118 can also assign task units to user devices 110A, 110B, 110N based at least in part on a trust score for the user device. A trust score for a user device 110A, 110B, 110N can be based on various factors. In some examples, the trust score for a user device 110A, 110B, 110N is based at least in part on whether the user device 110A, 110B, 110N has successfully completed previous assigned task units. For example, a user device 110A, 110B, 110N that regularly returns incorrect task unit results may be assigned a low trust score. On the other hand, a user device 110A, 110B, 110N that consistently returns correct task unit results may be assigned a higher trust score.

Trust scores can also be based on the results of spot checks or other trustworthiness test. In a spot check, the grid management system 102 provides a user device 110A, 110B, 110N with a dummy task unit module. The dummy task unit module may not be part of a task. The grid management system 102 has pre-calculated a result that the user device 110A, 110B, 110N should return for the dummy task unit module. For example, the series of operations specified by the dummy task unit module can be a series of operations that can be performed in a complex manner and in a simpler, algorithmic manner. One example of such a series of operations is summing all of the numbers in a particular range. The dummy task module can instruct the user device 110A, 110B, 110N to find the sum in a complex manner by adding each successive number in the range. The grid management system 102 can find the sum by applying an algorithmic technique. In some examples, a user device 110A, 110B, 110N that has a secure enclave, such as the secure enclave 825 of the user device 810A of FIG. 8, can be assigned a higher trust score.

When the user device 110A, 110B, 110N completes the dummy task unit module, it returns a result to the grid management system 102. If the result matches the pre-calculated result, then the user device's trust score is increased. If the result does not match the pre-calculated result, then the user device's trust score is decreased. In some examples, the grid management system 102 also monitors the amount of time that it takes for the user device 110A, 110B, 110N to execute the dummy task module. For example, if the user device 110A, 110B, 110N returns a result too quickly, it may indicate that the user device 110A, 110B, 110N utilized the algorithmic shortcut instead of performing the processing complex manner instructed by the dummy task unit module. If detected, this can also reduce the user device's trust score.

The task scheduler subsystem 118 may be configured to avoid assigning task units to user devices 110A, 110B, 110N having trust scores lower than a threshold level. Also, in some examples, the task scheduler subsystem 118 can use remedial techniques when assigning a task unit to a user device 110A, 110B, 110N with a low trust score.

One example remedial technique involves redundancy. For example, the task scheduler subsystem 118 can be configured to assign each task unit to more than one user device 110A, 110B, 110N. In this way, if one user device 110A, 110B, 110N navigates away from the web content, closes its web browser, or otherwise fails to perform its assigned task unit, the overall processing of the grid computing system is less likely to be affected. If a user device 110A, 110B, 110N has a low trust score, the task scheduler subsystem 118 may be configured to increase the number of over user devices 110A, 110B, 110N that are assigned the same task unit.

Another example remedial technique is check-pointing. According to check-pointing, the task scheduler 118 brakes a task unit into a series of task sub-units. The task unit module is configured to cause the user device 110A, 110B, 110N to report task sub-unit results. In this way, if a user device 110A, 110B, 110N is erroneously calculating a task unit, the grid management system 102 can detect the error before the full task unit is executed and can assign the task unit to another user device 110A, 110B, 110N. For example, if a user device 110A, 110B, 110N has a low trust score, the task scheduler subsystem 118 may be configured to assign a task unit to the user device 110A, 110B, 110N using check-pointing.

Upon receiving a task unit module, a user device 110A, 110B, 110N executes the task unit module to perform its assigned task. As described herein, the task unit module, when executed, causes the user device 110A, 110B, 110N to download task work data. Task work data can be downloaded from the grid management system 102, from a data storage device or service (see FIG. 2), and/or from another user device 110A, 110B, 110N. Upon receiving task work data, the user device 110A, 110B, 110N executes its task unit and returns task unit results to the grid management system 102.

A task summer subsystem 120 of the grid management system 102 receives task unit results from the various user devices 110A, 110B, 110N. The task summer subsystem 120 aggregates or sums the results into an overall task result. The task result is provided to the grid consumer device 104A, 104B, 104N that requested the task.

Figure 2:
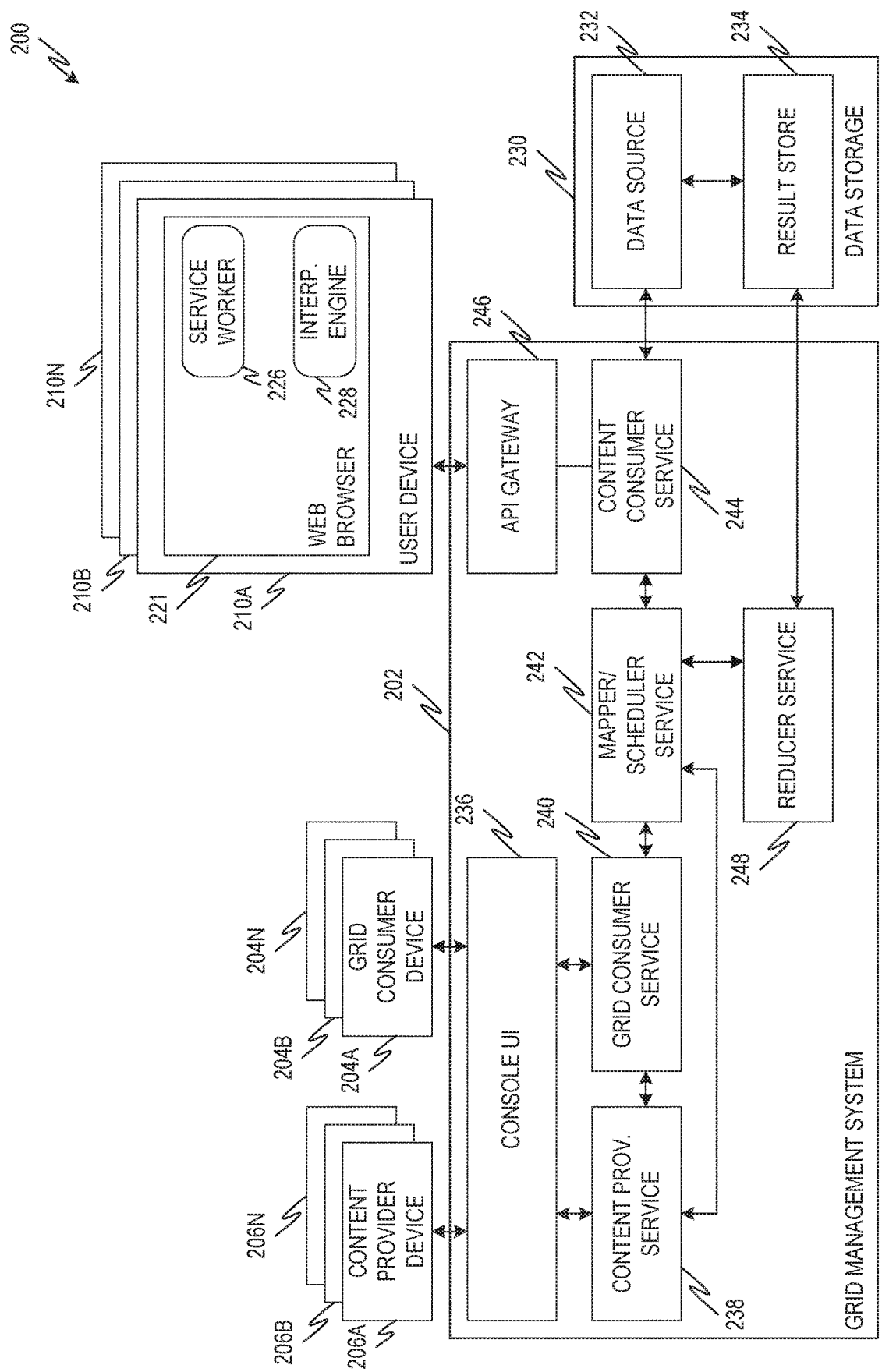
FIG. 2 is a diagram showing another example of an environment for implementing a grid computing system.

FIG. 2 is a diagram showing another example of an environment 200 for implementing a grid computing system. The environment 200 includes a grid management system 202, grid consumer devices 204A, 204B, 204N and content provider devices 206A, 206B, 206N. Grid consumer devices 204A, 204B, 204N may be similar to the grid consumer devices 104A, 1043, 104N described herein. Similarly, content provider devices 206A, 206B, 206N may be similar to the content provider devices 106A, 106B, 106N described herein. Also, user devices 210A, 210B, 210N may be similar to the user devices 110A, 110B, 110N described herein.

The grid management system 202 in FIG. 2 includes various components for managing a grid computing system as described herein. A console user interface (UI) 236 is configured to provide interaction between grid consumer devices 204A, 204B, 204N and a grid consumer service 240. The console UI 236 can provide functionality permitting a grid consumer device 204A, 204B, 204N to log-in and authenticate to the grid management system 202. The console UI 236 can also provide access to functionality of the grid consumer service 240. For example, through the console UI 236, the grid consumer service 240 can receive task description data from a grid consumer device. In some examples, the grid consumer service 240 and console UI 236 can include functionality for receiving or generating non-executable task description data, as described herein. For example, the console UI 236 may include a window for uploading or otherwise receiving textual expressions of SQL or similarly-formatted task description data.

The grid consumer service 240, also through the console UI 236, can receive task work data from a grid consumer device 204A, 204B, 204N. Task work data can be provided directly to the grid management system 202. In some examples, a grid consumer device 204A, 204B, 204N provides a location of a data storage 230 that stores task work data. The data storage 230 can be a remote server, a cloud storage location, or any other suitable location. The grid consumer service 240 can also provide task results to a grid consumer device 204A, 204B 204N via the console UI 236. The console UI 236 can also include functionality for providing task results to the grid consumer devices 204A, 204B, 204N. The grid consumer service 240 can interact with other components of the grid management system, as described herein.

The console UI 236 can also include functionality for interfacing content provider devices 206A, 206B, 206N to a content provider service 238. The console UI 236 can include functionality for log-in and authentication of content provider devices 206A, 206B, 206N. Also, for example, the content provider service 238 can receive the URL or other address of web content that is to include access code, as described herein through the console UI 236. The content provider service 238 can also provide the content provider device 206A, 206B, 206N with access code to be embedded in web content. The content provider service 238 can interact with other components of the grid management system 202 as described herein.

A mapper/scheduler service 242 receives task description data from the grid consumer service 240 and generates task units and task unit modules, as described herein. The mapper/scheduler service 242 matches the task units to user devices 210A, 210B, 210N for execution. User devices 210A, 210B, 210N communicate with a content consumer service 244 via an application programming interface (API) gateway 246. For example, ready messages are provided from the user devices 210A, 210B, 210N to the content consumer service 244 via the API gateway 246. When a ready message is received, the content consumer service 244 passes information about the sending user device 210A, 210B, 210N to the mapper/scheduler service 244, which may assign a task unit to the user device 210A, 210B, 210N. The mapper/scheduler service 242 provides the content consumer service 244 with the task unit module corresponding to a task unit assigned to a user device 210A, 2101B, 210N. The content consumer service 244 provides the task unit module to the appropriate user device 210A, 210B, 210N via the API gateway 246.

The user device 210A, 210B, 210N, upon receiving a task unit module, executes the task unit module for example, in a web browser executing at the user device 210A, 210B, 210N. For example, FIG. 2 shows an example web browser 221 executing at the user device 210A. The web browser comprises an interpreter engine 228, such as a JavaScript engine or other suitable interpreter engine. The interpreter engine 228 receives and executes interpreted code. For example, a task unit module executed at the user device 210A can include interpreted code, such as JavaScript code, that is interpreted and executed using the interpreter engine 228.

In some examples, the task unit module includes service worker code for executing a service worker 226 at the web browser 221. Service worker code can include JavaScript code executed using the interpreter engine 228 or, in some examples, can include web binary code as described herein. In some examples, the service worker 226 is configured according to the guidelines set forth in Service Workers 1, W3C Working Draft from the World Wide Web Consortium. The service worker 226 executes in the web browser 221 to execute some or all of a task unit assigned to the user device 210A.

In some examples, the web browser 221 also includes web binary code, such as a WebAssembly module. Web binary code is pre-compiled at the grid management system 202 and provided as a binary for execution at the web browser 221. For example, because web binary code is pre-complied, it may not need to be interpreted by the interpreter engine 228 at runtime. In The user device 210A receives task unit work data to perform an assigned task unit. For example, the task unit module can include instructions that, when executed at the user device 210A, cause the user device 210A to access task unit work data. In the example of FIG. 2, task unit work data is received from a data source 232 at a data storage 230. The data storage 230 can be part of and/or managed by the grid management system 202. In some examples, the data storage 230 is a separate storage device or service. For example, the data storage 230 can include a cloud storage system. Also, as shown in more detail in FIG. 1, the user device 210A can receive task unit work data from other user devices 210A, 210B, 210N, for example, in a peer-to-peer transfer. For example, instructions for accessing task unit work data from other user devices 210A, 210B, 210N can be included in a task unit module. As described herein, the task unit module can be configured to prevent communication between user devices 210A, 210B, 210N while the task unit is being executed. Instead, in examples where a user device 210A, 210B, 210N receives task unit work data from another user device 210A, 210B, 210N, the task unit work data is received before execution of the task unit.

When a user device 210A, 210B, 210N completes its task unit, results can be provided to the grid management system 202 and/or to a results store 234 at the data storage 230. In the example of FIG. 1, the result store 234 is at the same data storage 230 as the data source 232. In other examples, the result store 234 is at a different location. When task unit results are written to the result store 234, the data storage 230 and/or the user device 210A, 210B, 210N can notify a reducer service 248 at the grid management system 202. The reducer service 248 determines whether all task units of a given task are complete. When all task units of a given task are complete, the reducer service 248 aggregates the task unit results to generate an overall result for the task. The overall result is provided to the grid consumer service 240 (e.g., via the mapper/scheduler service 242). The grid consumer service 240 provides the overall result to the grid consumer device 204A, 204B, 204N that requested the task, for example, via the console UI 236 in some examples, one or more of the user devices 210A, 210B, 210N include a secure enclave, such as the secure enclave 825 described with respect to the user device 810A below. A task unit module can be executed in the secure enclave, as described herein.

Figure 3:
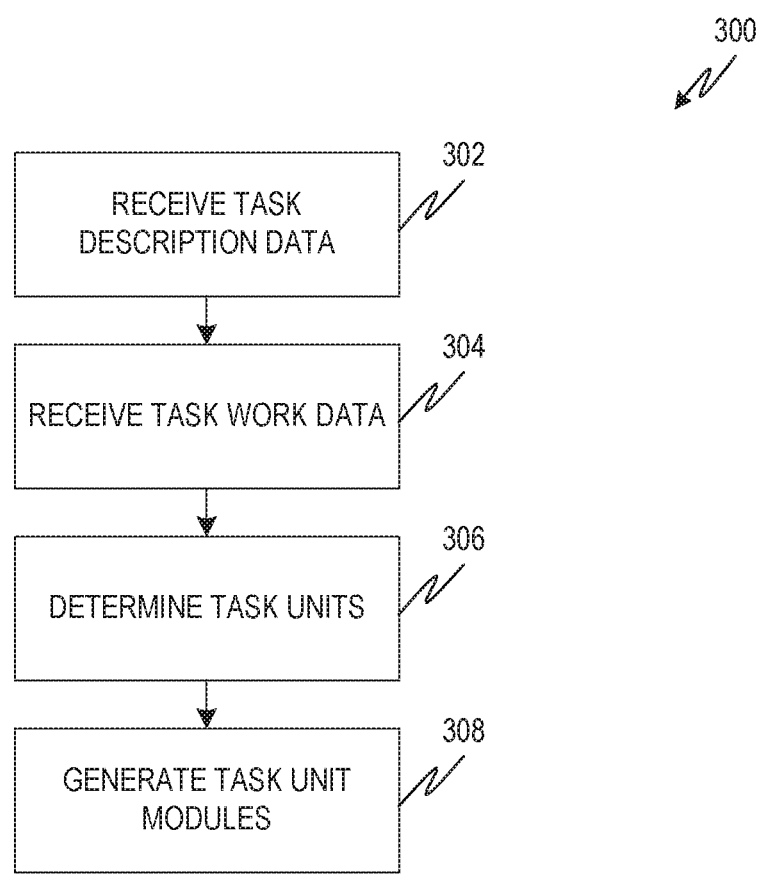
FIG. 3 is a flowchart showing one example of a process flow that can be executed by a grid management system to generate task unit modules for distribution to user devices.

FIG. 3 is a flowchart showing one example of a process flow 300 that can be executed by a grid management system, such as 102 or 202, to generate task unit modules for distribution to user devices. At operation 302, the grid management system receives task description data from a grid consumer device. The task description data can be represented in a non-executable format, as described herein. At operation 304, the grid management system receives task work data from the grid consumer device. Receiving the task work data can include receiving the task work data at the grid management system. Receiving the task work data can also include receiving an address of a data storage system, such as 230, where the task work data is stored. At operation 306, the grid management system determines task units for executing the task. Each task unit describes an independent set of operations that can be executed at a user device to perform the task. Task units can be determined using a MapReduce model, in some examples, as described herein.

At operation 308, the grid management system generates task unit modules. Task unit modules include code that is to be executed at user device e.g., in a web browser thereof). Generating task unit modules can include generating instructions for executing a task unit in JavaScript or another suitable language, in some examples, generating task unit modules includes compiling code written in JavaScript, C++, or another suitable language to generate web binary code, such as a WebAssembly module.

Figure 4:
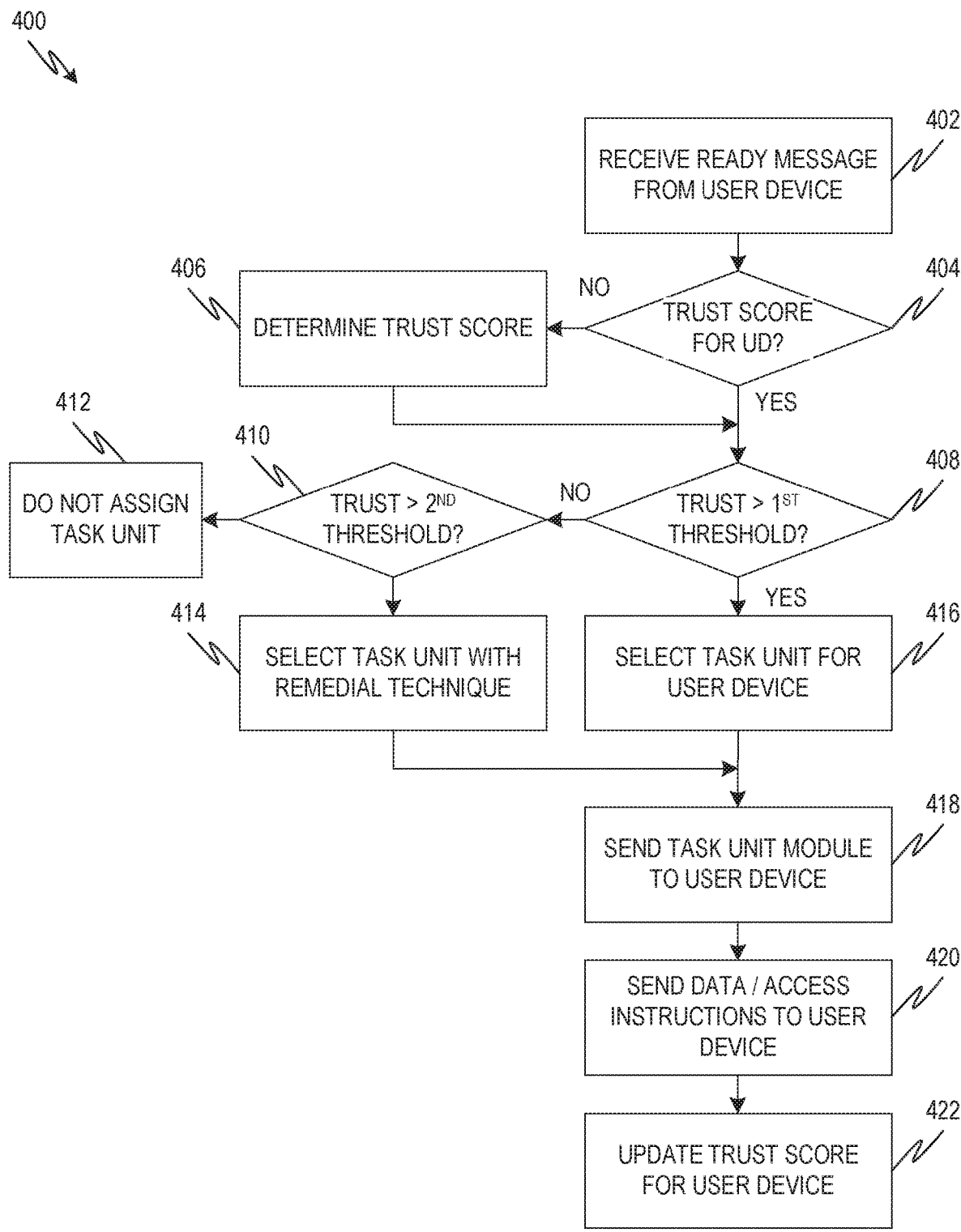
FIG. 4 is a flowchart showing one example of a process flow that can be executed by a grid management system to provide a user device with a task unit for execution.

FIG. 4 is a flowchart showing one example of a process flow 400 that can be executed by a grid management system to provide a user device with a task unit for execution. For example, the process flow 400 can be executed by the task scheduler subsystem 118 and/or the mapper/scheduler service 242. At operation 402, the grid management system receives a ready message from the user device. As described herein, the user device can receive web content with access code embedded therein. When executed, the access code causes the user device to send the ready message. As described herein, the ready code can include a description of the user device, such as a MAC address, a browser fingerprint, and/or other device characteristics.

At operation 404, the grid management system determines if the grid management system has a trust score for the user device. The grid management system may have a trust score for the user device, for example, if the user device has previously executed a task unit for the grid management system. If a trust score is present, the grid management system proceeds to operation 408 described herein.

If the grid management system does not have a trust score for the user device, the grid management system determines a trust score for the user device at operation 406. Determining a trust score can include assigning a default trust score to the user device. Determining a trust score can also include performing a spot check or other test of trust worthiness of the user device.

If a trust score is present or after determining the trust score at operation 406, the grid management system determines, at operation 408, determines if the trust score is higher than a first threshold. User devices with trust scores higher than the first threshold may be suitably trustworthy to execute a task unit. Accordingly, if the trust score is higher than the first threshold, the grid management system assigns a task unit for the user device at operation 416. Assigning the task unit can include selecting a task unit based on device characteristics of the user device as described herein.

If the trust score is not higher than the first threshold, the grid management system determines, at operation 410, whether the trust score for the user device is greater than a second threshold. The second threshold is lower than the first threshold (e.g., it indicates a lower level of trustworthiness). For example, user devices with trust scores lower than the second threshold may not be suitable for performing task units. If the user device's trust score is not higher than the second threshold, then the grid management system, at operation 412, may not assign a task unit to the user device.

If the user device's trust score is higher than the second threshold, then the grid management system may select a task unit for the user device with a remedial technique. For example, the grid management system may assign the same task unit to multiple user devices. In some examples, the grid management system assigns the same task unit to more user devices than otherwise. For example, if a particular task unit would ordinarily have been redundantly assigned to three user devices, the grid management system can assign the task unit to four or more user devices including the user device considered at the process flow 400. In another example, the task unit is assigned to the user device with check-pointing, as described herein.

At operation 418, the grid management system sends a task unit module to the user device. In examples where the task unit is assigned with a remedial technique, the task unit module can incorporate some or all of the remedial technique. For example, if the task unit is assigned with check-pointing, the check-pointing can be described by the task unit module. At operation 420, the grid management system sends to the user device task unit work data and/or instructions for accessing task unit work data.

At operation 422, the grid management system updates a trust score for the user device based on a response, if any, received from the user device. For example, if the user device fails to respond or responds with a task unit result that is incorrect, its trust score is reduced. If the user device provides a task unit response that is correct, then its trust score is maintained or increased. (The grid management system may determine whether a user device provides a correct task unit result by comparing the task unit result with task unit results from the same task unit performed redundantly by other user devices.)

Figure 5:
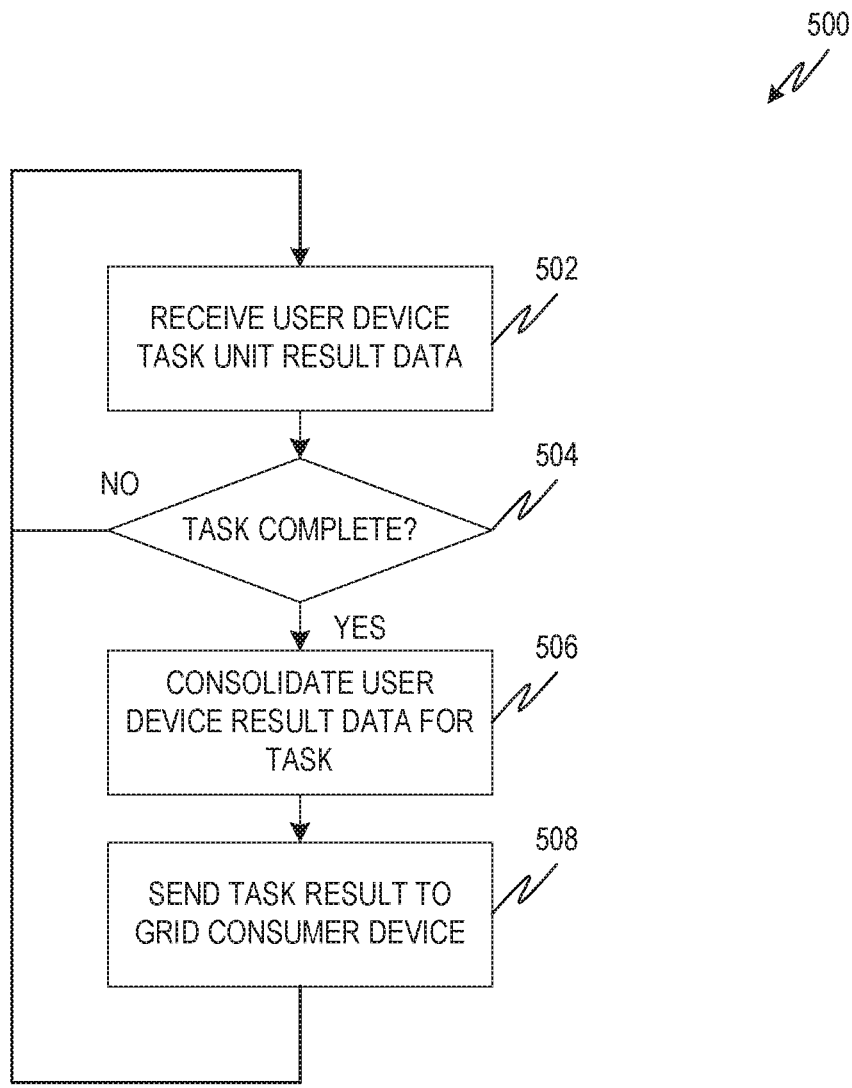
FIG. 5 is a flowchart showing one example of a process flow that may be executed by the grid management system (e.g., by a task summer or reducer service thereof) to generate a task result from task unit results provided by user devices.

FIG. 5 is a flowchart showing one example of a process flow 500 that may be executed by the grid management system (e.g., by a task summer or reducer service thereof) to generate a task result from task unit results provided by user devices. At operation 502, the grid management system receives task unit result data from a user device. The grid management system may receive the task unit result data directly from a user device, in some examples, the grid management system accesses the task result data from a remote location, such as the result store 234. For example, the user device and/or the result store may provide the grid management system with an indication that the task unit result data is ready. In some examples, the grid management system also accrues compensation to the content provider associated with the web content that prompted the user device to join the distributed computing network. For example, the accrued compensation can be a portion of the fee charged to the grid consumer based on a relationship between the completed task unit and the set of all task units in the task.

At operation 504, the grid management system determines whether the task corresponding to the task unit result data is complete. The task is complete, for example, if all task units of the task have been completed. If the task is not complete, the grid management system waits to receive the next task unit result for the task at operation 502. If the task is complete, the grid management system consolidates task unit result data from all task units making up the task at operation 506 to generate task result data. The task result data is provided to the grid consumer device that requested the task at operation 508.

Figure 6:
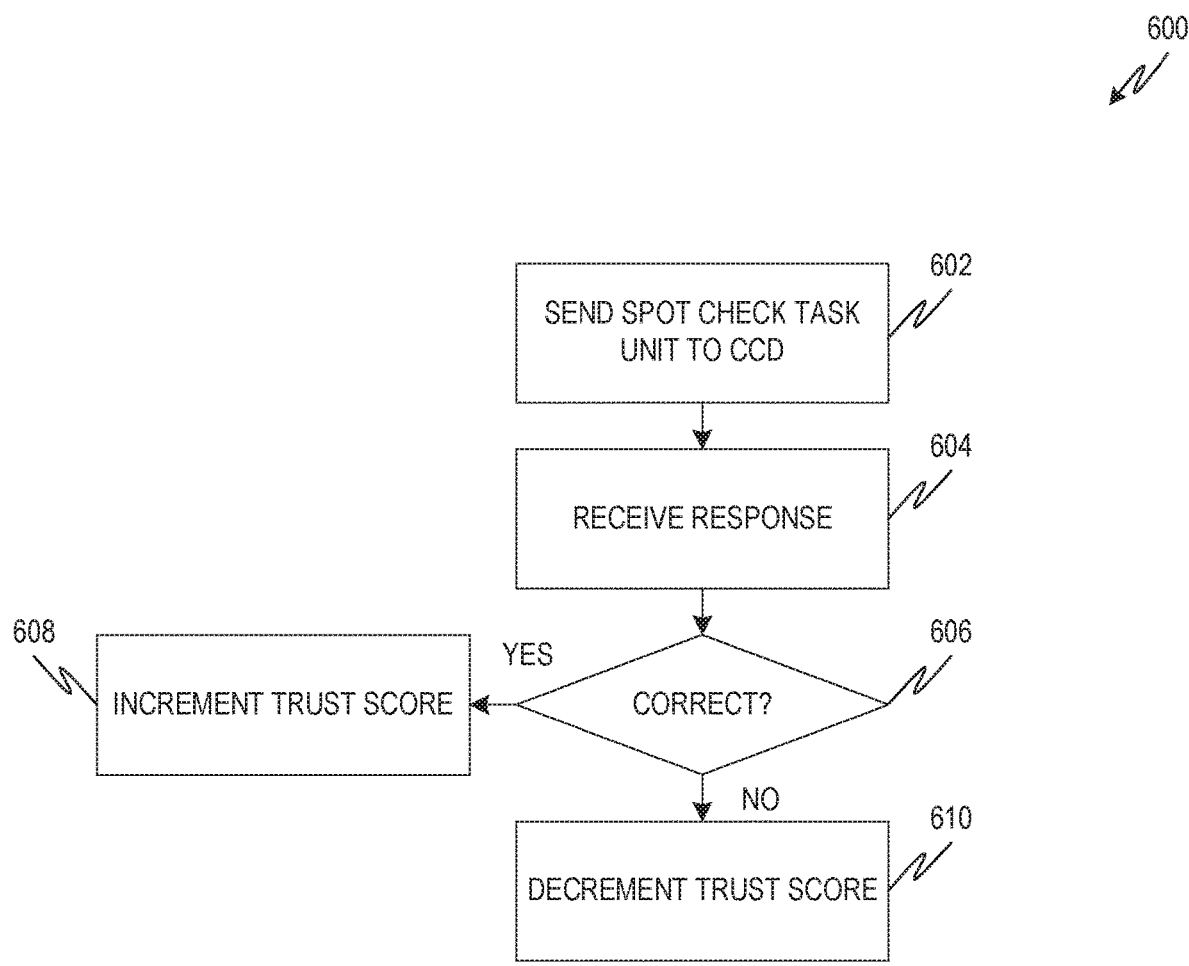
FIG. 6 is a flowchart showing one example of a process flow that may be executed by a grid management system to determine a trust score for a user device.

FIG. 6 is a flowchart showing one example of a process flow 600 that may be executed by a grid management system to determine a trust score for a user device. The process flow 600 is one example way that the grid management system can execute operation 406 of the process flow 400. At operation 602, the grid management system sends a spot check to the user device. The spot check, as described herein, includes sending the user device a dummy task unit module. The user device processes the dummy task module and provides a response. The grid management system receives the response at operation 604.

At operation 606, the grid management system determines if the received response is correct. For example, the grid management system can compare the response to an algorithmically-determined response generated by the grid management system. Determining whether the response is correct can also include determining how long it took the user device to provide a response. For example, if the user device provides a response too quickly, it may indicate that the user device calculated the response algorithmically instead of according to the dummy task module. This may be considered an incorrect response. If the response is correct, the trust score for the user device is increased at operation 608. If the response is incorrect, the trust score for the user device is decreased at operation 610.

Figure 7:
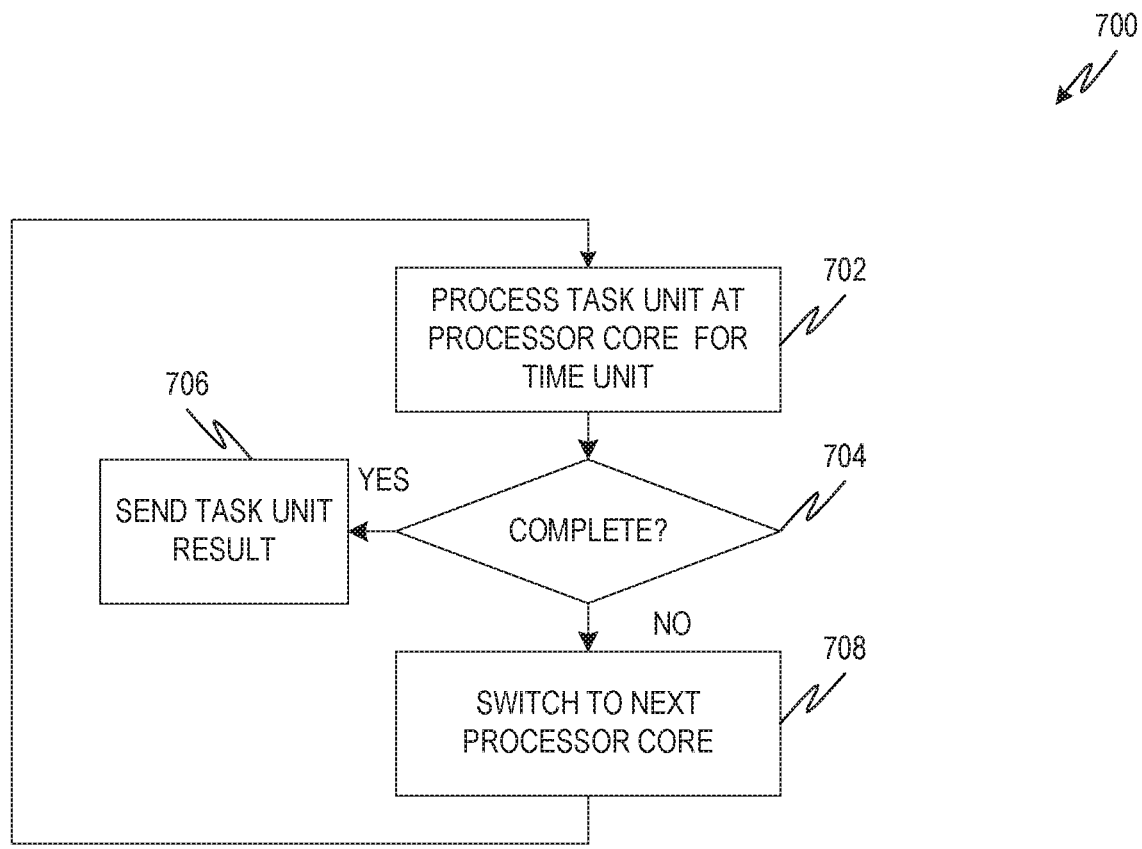
FIG. 7 is a flowchart showing one example of a process flow that may be executed by a user device.

FIG. 7 is a flowchart showing one example of a process flow 700 that may be executed by a user device. For example, the user device can execute the process flow 700 when a task unit module is executed at the user device. The process flow 700 can reduce heating at the user device and may, therefore, reduce the amount of time that a cooling fan at the user device runs. This can improve user device performance and may lead to a higher-quality experience for the content consumer.

At operation 702, the user device processes a task unit at a first processor core for a first time unit. At operation 704, the user device determines whether the task unit is complete. If yes, the user device sends a task unit result directly or indirectly to the grid management system at operation 706. If the task is not complete, the user device changes to a next processor core at operation 708. The user device then returns to operation 702. In this way, processing of the task unit at the user device jumps from processor core to processor core. This may prevent any single processor core from becoming too hot and can, therefore, reduce cooling fan usage.

Figure 8:
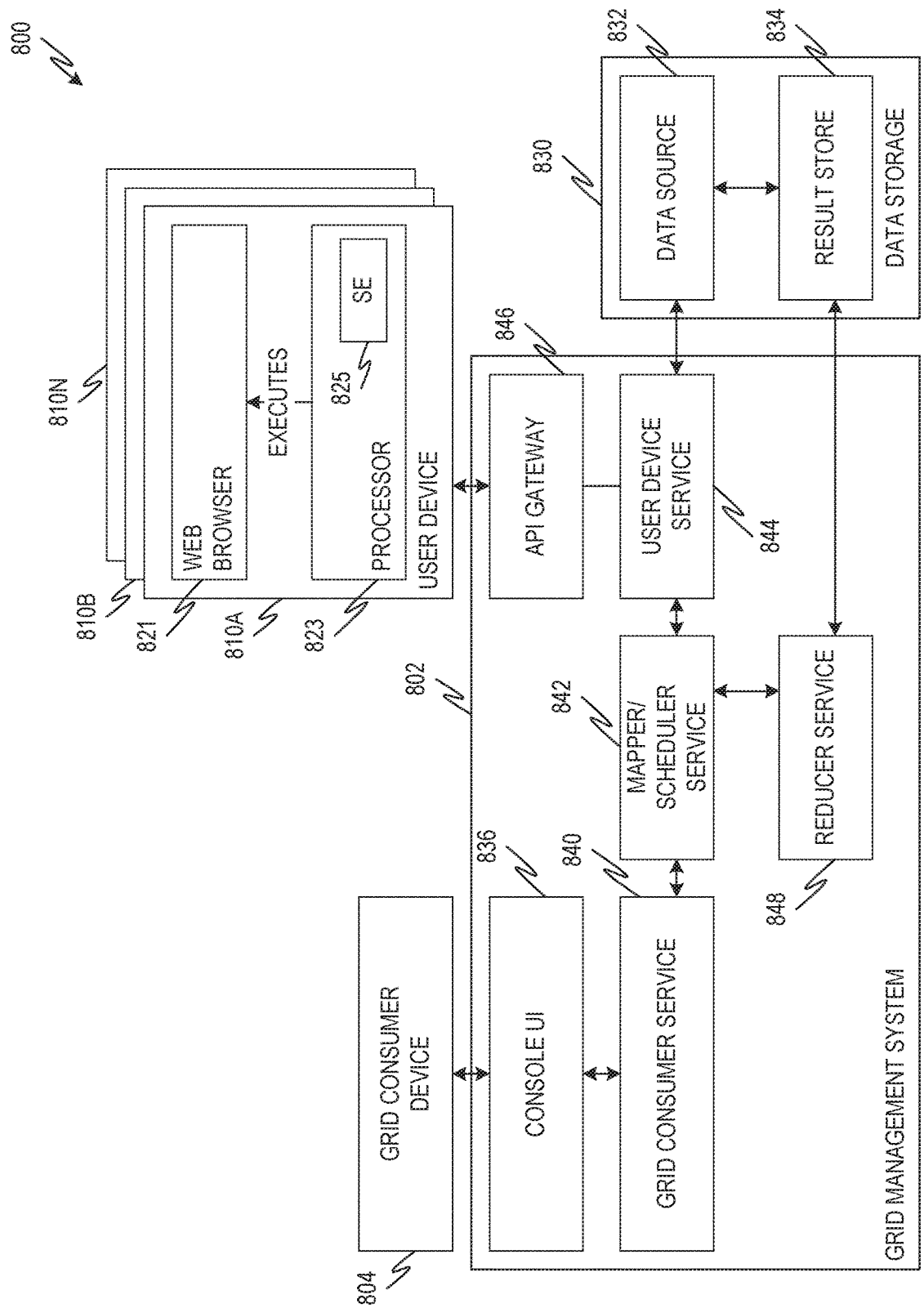
FIG. 8 is a diagram showing another example of an environment for implementing a grid computing system.

FIG. 8 is a diagram showing another example of an environment 800 for implementing a grid computing system. The environment 800 shows an example arrangement in which the grid computing system is implemented utilizing user devices 810A, 810B, 810N of an enterprise, such as a corporation, a division of a corporation, or other suitable organization including user devices 810A, 810B, 810N. Accordingly, the environment 800 does not include content provider devices.

In some examples, user devices 810A, 810B, 810N execute processing tasks unrelated to the grid computing system for respective users. Grid computing tasks, as described herein, may be implemented to utilize excess capacity of the user devices 810A, 810B, 810N (e.g., capacity that is not used to execute other processing tasks for users). For example, if a user is checking e-mail, excess processing capacity not used to check e-mail can be used to execute tasks for the grid computing system.

The environment 800 includes a grid management system 802, a grid consumer device 804 and the user devices 810A, 810B, 810N. User devices 810A, 810B, 810N may be similar to the user devices 110A, 110B, 110N, 210A, 210B, 210N described herein. In some examples, the user devices 810A, 810B, 810N are part of a common local area network (LAN), for example, implemented by an enterprise. Other components of the environment 800, including the grid management system 802 and, in some examples, the data storage 830 can be part of the same LAN. This increases the speed of data transfer between the various devices 810A, 810B, 810N and can, in some examples, increase the efficiency of the system.

The grid consumer device 804 can be similar to the grid consumer devices 104A, 104B, 104N, 204A, 204B, 204N described herein. The grid consumer device 804 generates tasks to be executed using the user devices 810A, 810B, 810N. Although one grid consumer device 804 is shown, multiple examples can be included in some arrangements.

The grid management system 802 in FIG. 8 includes various components for managing a grid computing system as described herein. A console user interface (UI) 836 is configured to provide interaction between grid consumer devices 804A, 804B, 804N and a grid consumer service 840. The console UI 836 can provide functionality permitting a grid consumer device 804A, 804B, 804N to log-in and authenticate to the grid management system 802. The console UI 836 can also provide access to functionality of the grid consumer service 840. For example, through the console UI 836, the grid consumer service 840 can receive task description data from a grid consumer device. In some examples, the grid consumer service 840 and console UI 836 can include functionality for receiving or generating non-executable task description data, as described herein. For example, the console UI 836 may include a window for uploading or otherwise receiving textual expressions of SQL or similarly-formatted task description data.

The grid consumer service 840, also through the console UI 836, can receive task work data from a grid consumer device 804A, 804B, 804N. Task work data can be provided directly to the grid management system 802. In some examples, a grid consumer device 804A, 804B, 804N provides a location of a data storage 830 that stores task work data. The data storage 830 can be a remote server, a cloud storage location, or any other suitable location. The grid consumer service 840 can also provide task results to a grid consumer device 804A, 804B, 804N via the console UI 836. The console UI 836 can also include functionality for providing task results to the grid consumer devices 804A, 804B, 804N. The grid consumer service 840 can interact with other components of the grid management system, as described herein.

A mapper/scheduler service 842 receives task description data from the grid consumer service 840 and generates task units and task unit modules, as described herein. The mapper/scheduler service 842 matches the task units to user devices 810A, 810B, 810N for execution. User devices 810A, 810B, 810N communicate with a content consumer service 844 via an application programming interface (API) gateway 846. For example, ready messages are provided from the user devices 810A, 810B, 810N to the content consumer service 844 via the API gateway 846. When a ready message is received, the content consumer service 844 passes information about the sending user device 810A, 810B, 810N to the mapper/scheduler service 844, which may assign a task unit to the user device 810A, 810B, 810N. The mapper/scheduler service 842 provides the content consumer service 844 with the task unit module corresponding to a task unit assigned to a user device 810A, 810B, 810N. The content consumer service 844 provides the task unit module to the appropriate user device 810A, 810B, 810N via the API gateway 846.

The user device 810A, 810B, 810N, upon receiving a task unit module, executes the task unit module for example, in a web browser executing at a processor of the user device 810A, 810B, 810N. For example, FIG. 8 shows an example web browser 821 executing at a processor 823 of the user device 810A. The web browser may comprise an interpreter engine, such as the interpreter engine 228 of FIG. 2. The interpreter engine can execute the task unit module. The web browser can also use one or more service workers, such as the service worker 226 of FIG. 2, to execute a task unit module.

The user device 810A receives task unit work data to perform an assigned task unit. For example, the task unit module can include instructions that, when executed at the user device 810A, cause the user device 810A to access task unit work data. In the example of FIG. 8, task unit work data is received from a data source 832 at a data storage 830. The data storage 830 can be part of and/or managed by the grid management system 802. In some examples, the data storage 830 is a separate storage device or service. For example, the data storage 830 can include a cloud storage system. Also, as shown in more detail in FIG. 1, the user device 810A can receive task unit work data from other user devices 810A, 810B, 810N. For example, instructions for accessing task unit work data from other user devices 810A, 810B, 810N can be included in a task unit module. As described herein, the task unit module can be configured to prevent communication between user devices 810A, 810B, 810N while the task unit is being executed. Instead, in examples where a user device 810A, 810B, 810N receives task unit work data from another user device 810A, 810B, 810N, the task unit work data is received before execution of the task unit.

When a user device 810A, 810B, 810N completes its task unit, results can be provided to the grid management system 802 and/or to a results store 834 at the data storage 830. In the example of FIG. 1, the result store 834 is at the same data storage 830 as the data source 832. In other examples, the result store 834 is at a different location. When task unit results are written to the result store 834, the data storage 830 and/or the user device 810A, 810B, 810N can notify a reducer service 848 at the grid management system 802. The reducer service 848 determines whether all task units of a given task are complete. When all task units of a given task are complete, the reducer service 848 aggregates the task unit results to generate an overall result for the task. The overall result is provided to the grid consumer service 840 (e.g., via the mapper/scheduler service 842). The grid consumer service 840 provides the overall result to the grid consumer device 804A, 804B, 804N that requested the task, for example, via the console UI 836.

In some examples, the user device 810A is configured to execute a task unit module using a secure enclave 825. The secure enclave 825 includes components of the processor 823, such as one or more registers, busses, etc., and other components of the user device 810A, such as, for example, data storage, and random access memory (RAM) or other memory. For example, the secure enclave 825 includes includes one or more key registers that store cryptographic keys associated with the secure enclave 825, one or more other registers for executing code in the secure enclave 825 and/or verifying a state of the secure enclave 825. In some examples, the secure enclave 825 can be implemented using the Software Guard. Extensions (SGX) feature available on some processors from Intel Corporation and/or the TrustZone feature available from Arm Holdings plc.

Hardware associated with the secure enclave 825, including components of the processor 823, memory, data storage, etc., can be cryptographically managed to limit and/or prevent a user and/or other applications executing at the user device 810A from accessing the secure enclave 825 and/or otherwise affecting the execution of task unit modules or other code executing at the secure enclave 825. In some examples, this can, supplement, reduce, or eliminate monitoring of the trustworthiness of the user device 810A.

In some examples, a task unit module for execution at the user device 810A is configured to be executed using the secure enclave 825. For example, the task unit module is encrypted by the grid management system 802 utilizing a cryptographic key associated with the processor 823. For example, the mapper/scheduler service 842 can encrypt task unit modules with the appropriate cryptographic key corresponding to the processor at which the task unit module is to be executed. For example, a task unit module to be executed at the user device 810A can be encrypted with a cryptographic key associated with the secure enclave 825 at the user device 810A. When the cryptographic key is symmetric, the grid management system 802 encrypts the task unit module using the same key that is later used by the processor 823 (e.g., components of the processor 823 that are assigned to the secure enclave 825) to decrypt the task unit module. When the cryptographic key is asymmetric, the grid management system 802 encrypts the task unit module using a public key associated with the user device 810A and/or processor 823. The processor 823 later uses an associated private key to decrypt the task unit module.

When the user device 810A receives the encrypted task unit module, the processor 823 decrypts the encrypted task unit module using a cryptographic key, for example, stored at a key register of the processor 823. In a symmetric arrangement, the cryptographic key used by the processor 823 is the same key used to decrypt the task unit module. In an asymmetric arrangement, the cryptographic key used by the processor 823 is a private key associated with the public key used to encrypt the task unit. The processor 823 uses the hardware components of the secure enclave 825 to execute the task module. For example, the task unit module and task unit data can be stored at memory and/or data storage of the secure enclave 825. The task unit module can be executed at components of the processor 823 that are part of the secure enclave 825.

In some examples, before decrypting the encrypted task unit module, the processor 823 verifies the secure enclave 825. For example, the processor 823 is configured to store status data describing a status of the hardware components of the secure enclave 825. The status data can describe include, for example, memory addresses that are part of the secure enclave 825, data storage locations that are part of the secure enclave 825, a check sum or other indication of the data stored at memory or data storage locations of the secure enclave 825, etc.

The status data is encrypted with a cryptographic key, which may be the same cryptographic key used to decrypt the encrypted task unit or a different cryptographic key. Before decrypting the task unit module, the processor 823 decrypts the encrypted status data to generate decrypted status data. If the decrypted status data matches the actual status of the secure enclave 825 hardware components, then the secure enclave is verified. Verifying the secure enclave 825 in this manner can detect and/or prevent tampering with the secure enclave 825 from outside users or applications. For example, if the status of the secure enclave 825 has changed, the secure enclave 825 may not decrypt or execute the task unit module.

EXAMPLES

Example 1 is a grid computing management system in communication with a grid consumer device and in communication with a plurality of user devices, the grid computing management system comprising: at least one processor; and a data storage device comprising instructions thereon that, when executed by the at least one processor to perform operations comprising: receiving, via a computer network and from the grid consumer device, first task description data describing a first task to be performed using the plurality of user devices; identifying a plurality of task units for executing the first task using the task description data; generating a plurality of task unit modules, wherein a first task unit module of the plurality of task unit module, when executed by a first user device of the plurality of user devices, causes the first user device to execute a first task unit of the plurality of task units; receiving, via the computer network, a ready message from the first user device, wherein the ready message describes web content accessed by the first user device; and sending, via the computer network, the first task unit module to the first user device.

In Example 2, the subject matter of Example 1 optionally includes wherein the first task description data comprises a functional programming language representation of the first task.

In Example 3, the subject matter of any one or more of Examples 1-2 optionally includes wherein the data storage device further comprises instructions thereon that, when executed by the at least one processor, cause the at least one processor to perform operations comprising, before sending the first task unit module to the first user device, determining that a trust score for the first user device is greater than a threshold trust score.

In Example 4, the subject matter of Example 3 optionally includes wherein the data storage device further comprises instructions thereon that, when executed by the at least one processor, cause the at least one processor to perform operations comprising: sending a dummy task unit module to the first user device; receiving spot check response data from the first user device; verifying the spot check response data; and updating the trust score for the first user device based at least in part on the verifying.

In Example 5, the subject matter of any one or more of Examples 1-4 optionally includes wherein the data storage device further comprises instructions thereon that, when executed by the at least one processor, cause the at least one processor to perform operations comprising, before sending the first task unit module to the first user device, encrypting the first task unit module using a cryptographic key associated with the first user device.

In Example 6, the subject matter of any one or more of Examples 1-5 optionally includes wherein the data storage device further comprises instructions thereon that, when executed by the at least one processor, cause the at least one processor to perform operations comprising: sending the first task unit module to a second user device; comparing a first task unit result received from the first user device with a first task unit result received from the second user device; and updating a trust score for the first user device based at least in part on the comparing.

In Example 7, the subject matter of any one or more of Examples 1-6 optionally includes wherein the data storage device further comprises instructions thereon that, when executed by the at least one processor, cause the at least one processor to perform operations comprising: determining that a trust score for the first user device is less than a threshold trust score; and responsive to determining that the trust score for the first user device is less than the threshold trust score, configuring the first task unit module to instruct the user device to return a result of a first sub-unit of the first task unit before completing a second sub-unit of the first task unit.

In Example 8, the subject matter of any one or more of Examples 1-7 optionally includes wherein the first task unit module comprises web binary code.

In Example 9, the subject matter of any one or more of Examples 1-8 optionally includes wherein the first task unit module comprises an instruction that, when executed in a browser application at the first user device, causes the browser application to launch a service worker for executing at least a portion of the first task unit.

In Example 10, the subject matter of any one or more of Examples 1-9 optionally includes wherein the first task unit module, when executed at the first user device, causes the first user device to perform operations comprising: executing a first task unit for a first time unit at a first processor core of the first user device; and after the first time unit, executing the first task unit at a second processor core of the first user device.

In Example 11, the subject matter of any one or more of Examples 1-10 optionally includes wherein the data storage device further comprises instructions thereon that, when executed by the at least one processor, cause the at least one processor to perform operations comprising selecting the first task for the first user device based at least in part on a device characteristic of the first user device.

In Example 12, the subject matter of any one or more of Examples 1-11 optionally includes wherein the data storage device further comprises instructions thereon that, when executed by the at least one processor, cause the at least one processor to send, to the first user device, task subunit work data access instructions, wherein the task subunit work data access instructions comprise a reference to a second user device comprising at least a portion of first task unit work data for the first task unit.

Example 13 is a method for managing a grid computing system, comprising: receiving, via a computer network and from a grid consumer device, first task description data describing a first task to be performed using a plurality of user devices; identifying a plurality of task units for executing the first task using the task description data; generating a plurality of task unit modules, wherein a first task unit module of the plurality of task unit module, when executed by a first user device of the plurality of user devices, causes the first user device to execute a first task unit of the plurality of task units; receiving, via the computer network, a ready message from the first user device, wherein the ready message describes web content accessed by the first user device; and sending, via the computer network, the first task unit module to the first user device.

In Example 14, the subject matter of Example 13 optionally includes wherein the first task description data comprises a functional programming language representation of the first task.

In Example 15, the subject matter of any one or more of Examples 13-14 optionally includes before sending the first task unit module to the first user device, determining that a trust score for the first user device is greater than a threshold trust score.

In Example 16, the subject matter of Example 15 optionally includes sending a dummy task unit module to the first user device; receiving spot check response data from the first user device; verifying the spot check response data; and updating the trust score for the first user device based at least in part on the verifying.

In Example 17, the subject matter of any one or more of Examples 13-16 optionally includes sending the first task unit module to a second user device; comparing a first task unit result received from the first user device with a first task unit result received from the second user device; and updating a trust score for the first user device based at least in part on the comparing.

In Example 18, the subject matter of any one or more of Examples 13-17 optionally includes determining that a trust score for the first user device is less than a threshold trust score; and responsive to determining that the trust score for the first user device is less than the threshold trust score, configuring the first task unit module to instruct the user device to return a result of a first sub-unit of the first task unit before completing a second sub-unit of the first task unit.

In Example 19, the subject matter of any one or more of Examples 13-18 optionally includes wherein the first task unit module comprises web binary code.

Example 20 is a machine-readable medium comprising instructions thereon that, when executed by at least one processor, cause the at least one processor to perform operations comprising: receiving, via a computer network and from a grid consumer device, first task description data describing a first task to be performed using a plurality of user devices; identifying a plurality of task units for executing the first task using the task description data; generating a plurality of task unit modules, wherein a first task unit module of the plurality of task unit module, when executed by a first user device of the plurality of user devices, causes the first user device to execute a first task unit of the plurality of task units; receiving, via the computer network, a ready message from the first user device, wherein the ready message describes web content accessed by the first user device; and sending, via the computer network, the first task unit module to the first user device.

Figure 9:
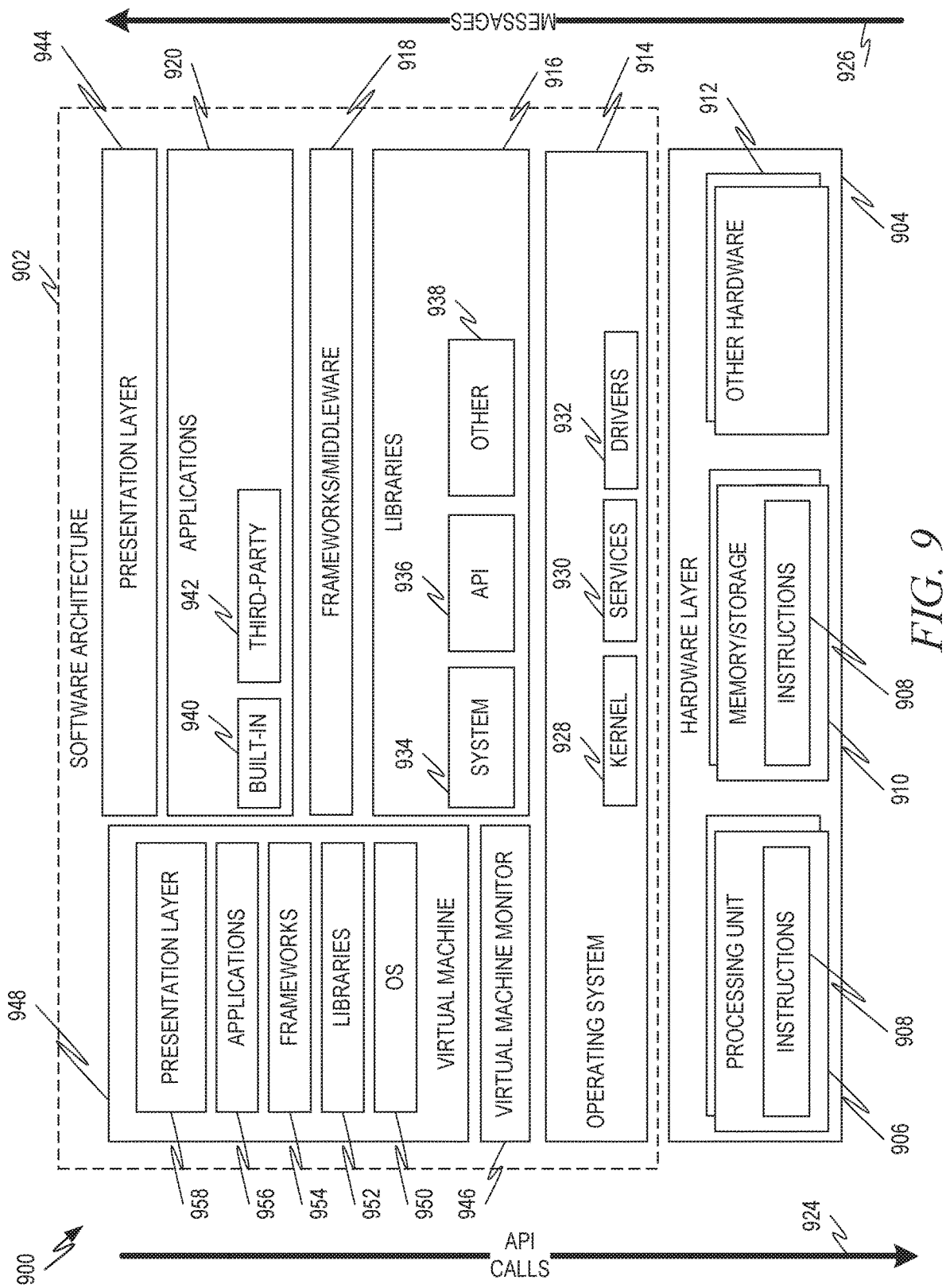
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system 1000 of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated as part of computer system 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules. In some examples, libraries 916 may provide one or more APIs serviced by a message oriented middleware.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine 948 is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations, it will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a computer network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a computer network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 10:
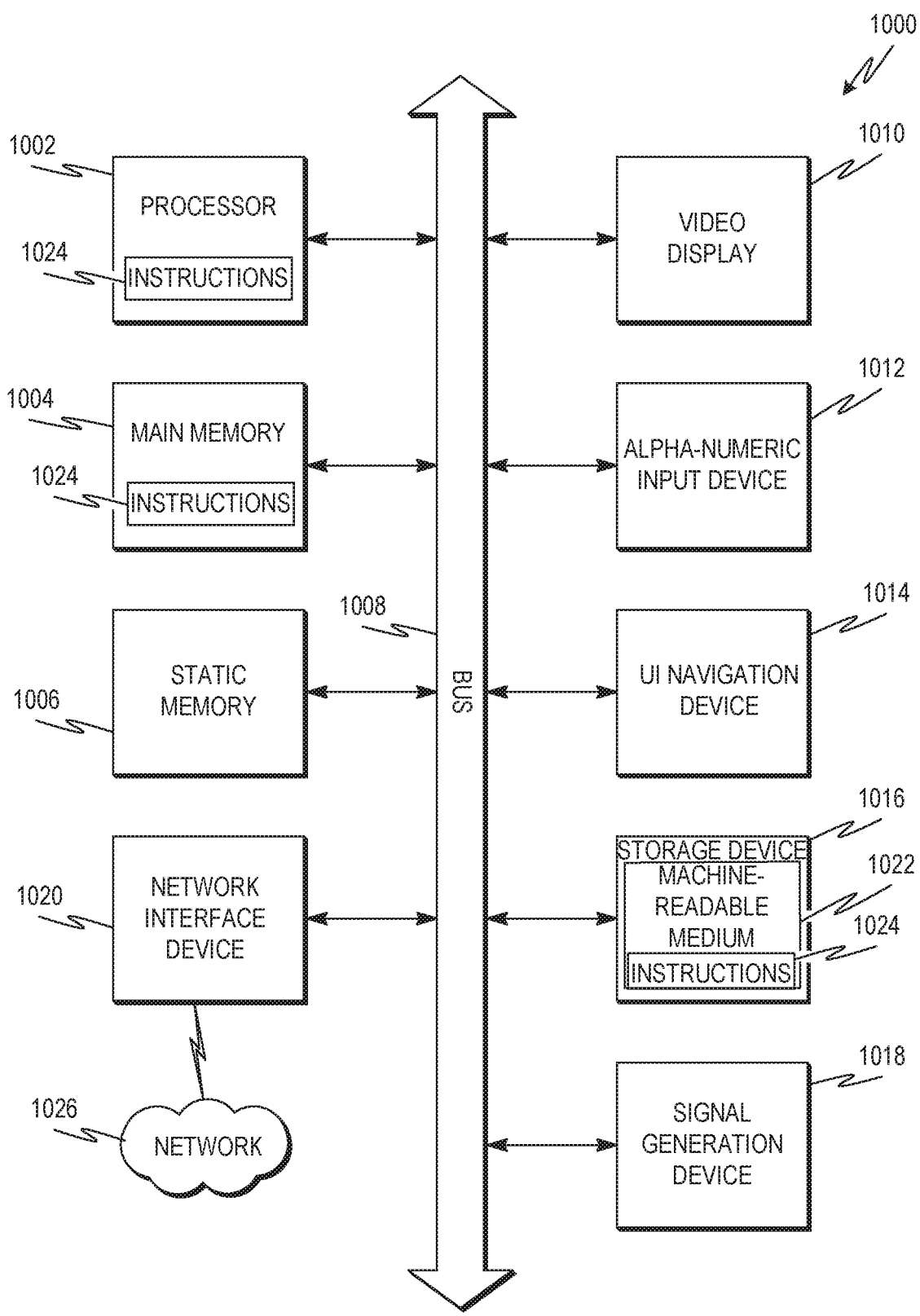
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive device 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of computer networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A grid computing management system in communication with a grid consumer device and in communication with a plurality of user devices, the grid computing management system comprising:
   at least one processor; and
   a data storage device comprising instructions thereon that, when executed by the at least one processor to perform operations comprising:
      receiving, via a computer network and from the grid consumer device, first task description data describing a first task to be performed using the plurality of user devices;
      identifying a plurality of task units for executing the first task using the first task description data;
      generating a plurality of task unit modules, wherein a first task unit module of the plurality of task unit module, when executed by a first user device of the plurality of user devices, causes the first user device to execute a first task unit of the plurality of task units;
      receiving, via the computer network, a ready message from the first user device, wherein the ready message describes web content accessed by the first user device;
      selecting the first user device to execute the first task unit, the selecting based at least in part on a trust score for the first user device;
      sending the first task unit module to the first user device;
      sending the first task unit module to a second user device of the plurality of user devices;
      comparing a first task unit result received from the first user device with a first task unit result received from the second user device; and
      updating the trust score for the first user device based at least on part on the comparing.

2. The grid computing management system of claim 1, wherein the first task description data comprises a functional programming language representation of the first task.

3. The grid computing management system of claim 1, wherein the data storage device further comprises instructions thereon that, when executed by the at least one processor, cause the at least one processor to perform operations comprising, before sending the first task unit module to the first user device, determining that the trust score for the first user device is greater than a threshold trust score.

4. The grid computing management system of claim 1, wherein the data storage device further comprises instructions thereon that, when executed by the at least one processor, cause the at least one processor to perform operations comprising:
   sending a dummy task unit module to the first user device;
   receiving spot check response data from the first user device;
   verifying the spot check response data; and
   updating the trust score for the first user device based at least in part on the verifying.

5. The grid computing management system of claim 1, wherein the data storage device further comprises instructions thereon that, when executed by the at least one processor, cause the at least one processor to perform operations comprising, before sending the first task unit module to the first user device, encrypting the first task unit module using a cryptographic key associated with the first user device.

6. The grid computing management system of claim 1, wherein the data storage device further comprises instructions thereon that, when executed by the at least one processor, cause the at least one processor to perform operations comprising:
  determining that the trust score for the first user device is less than a threshold trust score; and
  responsive to determining that the trust score for the first user device is less than the threshold trust score, configuring the first task unit module to instruct the first user device to return a result of a first sub-unit of the first task unit before completing a second sub-unit of the first task unit.

7. The grid computing management system of claim 1, wherein the first task unit module comprises web binary code.

8. The grid computing management system of claim 1, wherein the first task unit module comprises an instruction that, when executed in a browser application at the first user device, causes the browser application to launch a service worker for executing at least a portion of the first task unit.

9. The grid computing management system of claim 1, wherein the first task unit module, when executed at the first user device, causes the first user device to perform operations comprising:
  executing a first task unit for a first time unit at a first processor core of the first user device; and
  after the first time unit, executing the first task unit at a second processor core of the first user device.

10. The grid computing management system of claim 1, wherein the selecting of the first user device to execute the first task unit is also based at least in part on a device characteristic of the first user device.

11. The grid computing management system of claim 1, wherein the data storage device further comprises instructions thereon that, when executed by the at least one processor, cause the at least one processor to send, to the first user device, task subunit work data access instructions, wherein the task subunit work data access instructions comprise a reference to a second user device comprising at least a portion of first task unit work data for the first task unit.

12. A method for managing a grid computing system, comprising:
  receiving, via a computer network and from a grid consumer device, first task description data describing a first task to be performed using a plurality of user devices;
  identifying a plurality of task units for executing the first task using the first task description data;
  generating a plurality of task unit modules, wherein a first task unit module of the plurality of task unit module, when executed by a first user device of the plurality of user devices, causes the first user device to execute a first task unit of the plurality of task units;
  receiving, via the computer network, a ready message from the first user device, wherein the ready message describes web content accessed by the first user device;
  selecting the first user device to execute the first task unit, the selecting based at least in part on a trust score for the first user device;
  sending the first task unit module to the first user device;
  sending the first task unit module to a second user device of the plurality of user devices;
  comparing a first task unit result received from the first user device with a first task unit result received from the second user device; and
  updating the trust score for the first user device based at least on part on the comparing.

13. The method of claim 12, wherein the first task description data comprises a functional programming language representation of the first task.

14. The method of claim 12, further comprising, before sending the first task unit module to the first user device, determining that the trust score for the first user device is greater than a threshold trust score.

15. The method of claim 12, further comprising:
  sending a dummy task unit module to the first user device;
  receiving spot check response data from the first user device;
  verifying the spot check response data; and
  updating the trust score for the first user device based at least in part on the verifying.

16. The method of claim 12, further comprising:
  determining that the trust score for the first user device is less than a threshold trust score; and
  responsive to determining that the trust score for the first user device is less than the threshold trust score, configuring the first task unit module to instruct the first user device to return a result of a first sub-unit of the first task unit before completing a second sub-unit of the first task unit.

17. The method of claim 12, wherein the first task unit module comprises web binary code.

18. A tangible machine-readable storage medium comprising instructions thereon that, when executed by at least one processor, cause the at least one processor to perform operations comprising:
  receiving, via a computer network and from a grid consumer device, first task description data describing a first task to be performed using a plurality of user devices;
  identifying a plurality of task units for executing the first task using the first task description data;
  generating a plurality of task unit modules, wherein a first task unit module of the plurality of task unit module, when executed by a first user device of the plurality of user devices, causes the first user device to execute a first task unit of the plurality of task units;
  receiving, via the computer network, a ready message from the first user device, wherein the ready message describes web content accessed by the first user device;
  selecting the first user device to execute the first task unit, the selecting based at least in part on a trust score for the first user device;
  sending the first task unit module to the first user device;
  sending the first task unit module to a second user device of the plurality of user devices;
  comparing a first task unit result received from the first user device with a first task unit result received from the second user device; and
  updating the trust score for the first user device based at least on part on the comparing.

19. The medium of claim 18, the operations further comprising:
  sending a dummy task unit module to the first user device;
  receiving spot check response data from the first user device;
  verifying the spot check response data; and
  updating the trust score for the first user device based at least in part on the verifying.

20. The medium of claim 18, the operations further comprising:

determining that the trust score for the first user device is less than a threshold trust score; and responsive to determining that the trust score for the first user device is less than the threshold trust score, configuring the first task unit module to instruct the first user device to return a result of a first sub-unit of the first task unit before completing a second sub-unit of the first task unit.

* * * * *